Patented Dec. 14, 1926.

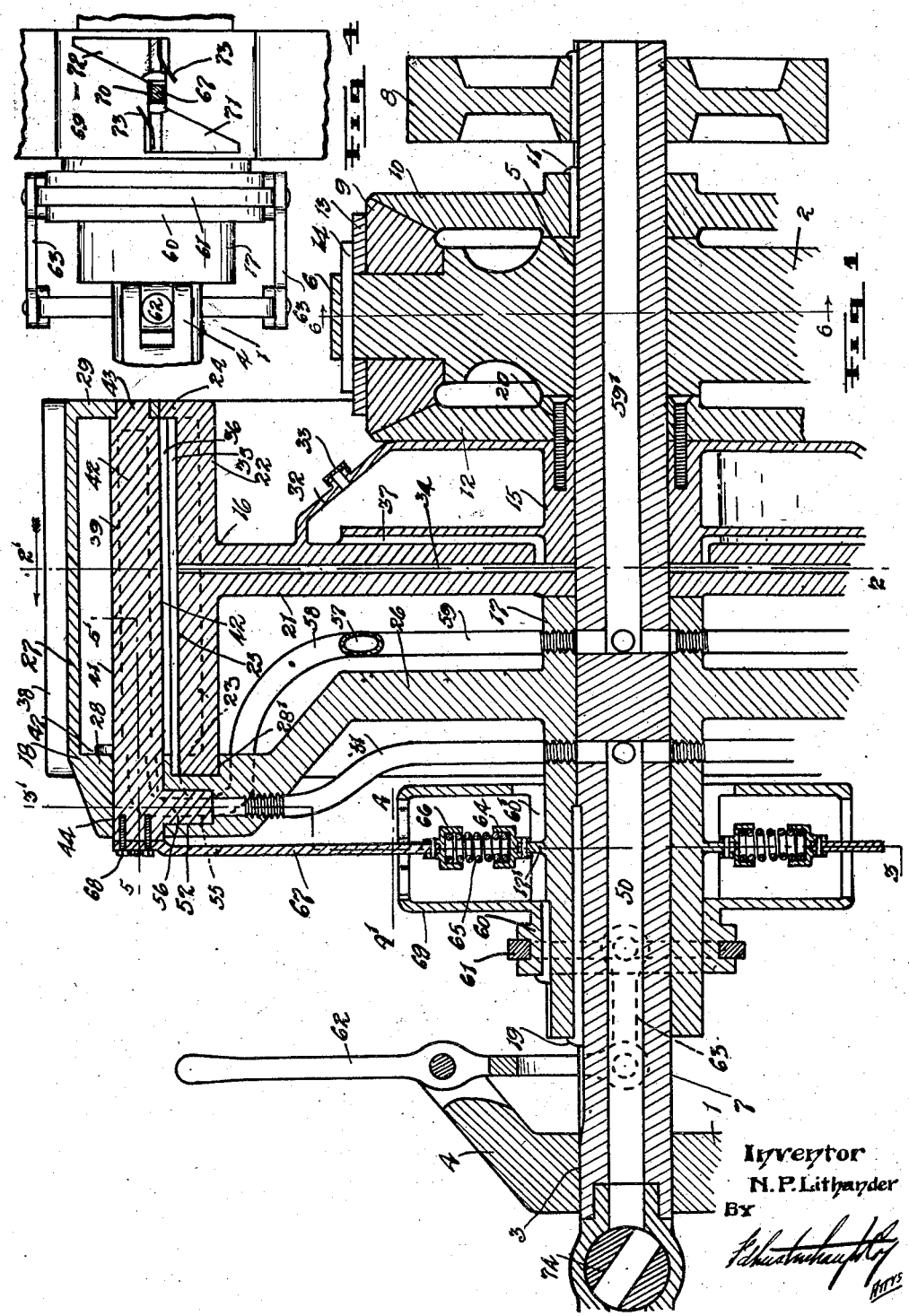

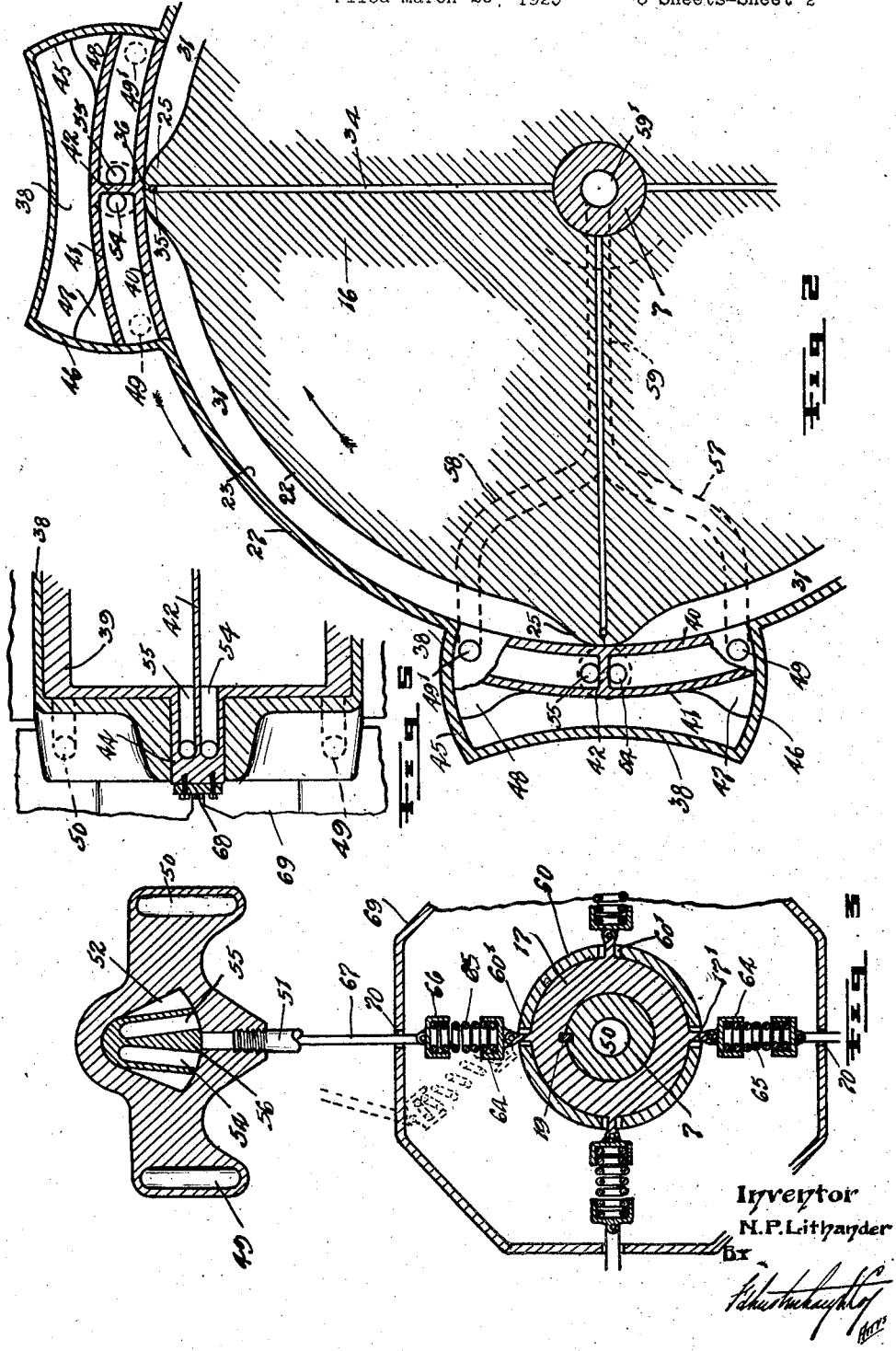

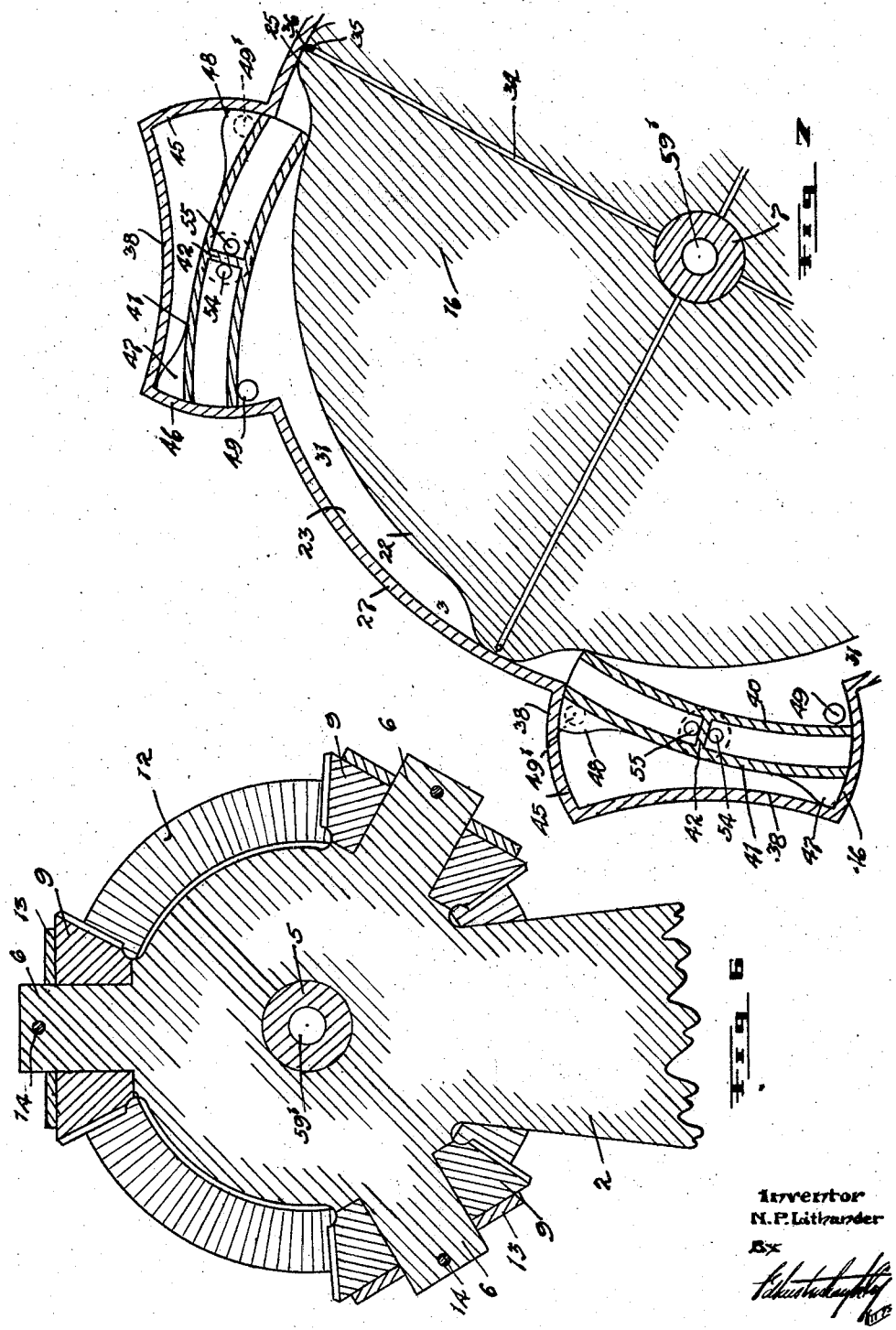

1,610,613

UNITED STATES PATENT OFFICE.

NELSON P. LITHANDER, OF BRANDON, MANITOBA, CANADA.

ROTARY ENGINE.

Application filed March 20, 1925. Serial No. 17,093.

The invention relates to improvements in rotary engines and particularly to rotary steam engines and an object of the invention is to provide an efficient smooth running economical engine of the above type and arranged so that there is almost continuous expansion of steam and so that the expansions are occurring at diametrically opposite points to balance the engine and increase its power.

A further object of the invention is to provide a steam engine having comparatively few mechanically operated parts which permits of the standardizing and of quick and cheap assembly.

A further object is to construct the engine so that it can be converted into a high or low speed engine as occasion demands and also so that the direction of the rotation of the engine can be reversed if so desired.

With the above more important objects in view, the invention consists essentially in the arrangement and construction of parts hereinafter described. reference being had to the accompanying drawings, in which:

Fig. 1 is a longitudinal vertical sectional view of my rotary steam engine, the lower part of the engine being omitted.

Fig. 2 is a vertical sectional view at 2—2′ Figure 1 and looking in the direction of the applied arrow.

Fig. 3 is a vertical sectional view at 3—3′ Figure 1.

Fig. 4 is a horizontal sectional view at 4—4′ Fig. 1 and looking downwardly.

Fig. 5 is a horizontal sectional view at 5—5′ Figure 1 and looking downwardly.

Fig. 6 is a vertical cross sectional view at 6—6′ Figure 1.

Fig. 7 is a sectional view similar to Figure 2 but with the rocking members shown in the position for admitting motive fluid to the expansion chambers.

In the drawings like characters of reference indicate corresponding parts in the several figures.

A pair of supporting standards 1 and 2 are provided, these being suitably mounted on a fixed base depending in what location the engine is used. The standard 1 is provided at its upper end with a bearing 3 and with an extending bracket 4 adjoining the bearing. The standard 2 is supplied also with a bearing 5 axially aligned with the bearing 3 and it is equipped also with three similar equi-spaced radiating stub shafts 6 utilized for supporting similar bevel pinions later described.

The main shaft 7 of the engine is rotatably mounted in the bearings 3 and 5 and it is provided at one end with a driving pulley 8, keyed thereto. The stub shafts 6 carry rotatably similar bevel pinions 9 which are continuously in mesh with an outer bevel gear 10, keyed to the shaft as indicated at 11 and with an inner bevel gear 12 rotatably mounted on the shaft adjacent the inner side of the bearing 5. The bevel pinions are held in place by a washer 13 and a pin 14 in each instance. Adjoining the bevel gear 12, I mount rotatably on the shaft the hub 15 of what I herein term the inner rotor 16 and adjoining the hub 15, I mount the hub 17 of what I herein term the outer rotor 18, the latter hub being fastened to the shaft 7 by a key 19. The bevel gear 12 is fastened to the hub 15 by suitably positioned screws 20. The rotor 16 is carried by a disk-like web 21 and the outer edge of the web terminates in a comparatively wide rim 22 which is fitted at the edges with outstanding continuous flanges 23 and 24. The rim is provided in locations ninety degrees apart, with outstanding ribs 25, the ends of which merge into the flanges. The ribs are more or less semi-circular in cross section and they are of the same height as the flanges. The hub 17 carries a web 26. The outer part is angularly deflected as best shown in Figure 1. The web 26 carries a rim 27 and the rim presents side flanges 28 and 29, the flange 28 being in reality the connecting element between the rim 27 and the web 26. The flange 28 is supplied on the inner side with a continuous groove or channel 28′ which is adapted to receive the flange 23 of the rim 22 and the rim 24, is positioned within the rim 29. By such construction, the rims and flanges of the rotors enclose an interior chamber 30. The ribs 25 of the rotor 16 are designed so that their outer faces make sliding contact with the inner face of the rim 27 with the result that in the present instance, the annular chamber is divided into four similar working chambers 31.

An oil well 32 is cast integrally with the web and hub of the rotor 16, the well being provided with a filling cap 33. The web of the latter rotor is also supplied with radiating holes 34 which pass inwardly to the shaft 7 and outwardly to the ribs 25, the ribs being fitted with lengthwise extending holes 35 communicating with those 34 and with narrow slots 36 formed in the web and communicating with the holes 35. In the well, I locate a number of radially extending passages 37, the inner ends of which communicate with the oil holes 35, and the outer ends of which are just nicely clear of the outer wall of the well.

The outer rim 27 carries a plurality of similar housings 38 positioned ninety degrees apart and in the housings, I mount rocker members 39. The rocker members present inner and outer walls 40 and 41 which are concentric to the shaft 7, the radius of the inner wall being the same as the radius of the rim 27, whilst the radius of that 41 is somewhat larger. Centrally the rocker member is divided by a partition 42 and at the ends, it is equipped with end spindles 43 and 44, these being rotatably mounted in the flanges 28 and 29. The open sides of the rocker members are adapted in certain positions thereof to be closed by the curved ends 45 and 46 of the housings and each rocker member is provided at the sides, with outstanding flanges 47 and 48 which are adapted to sweep over the face of the housing and open or close exhaust ports 49 and 49' hereinafter more fully described.

The shaft 7 is provided at one end with an interior inlet passage 50, the inner end of which is projected through the shaft and hub 17 and communicates with four similar feed pipes 51 which are utilized to supply live steam to the rocker members. The outer rotor is provided adjacent the housings with a facial enlargement which is utilized to give an interior valve chamber 52 which is in direct communication with the pipe 51 in each instance. The stem 44 of each rocker member is provided with two inlet passages 54 and 55 which are separated in the valve chamber by a web 56. The web 56 is designed in the central position of the rocker member to close the entering end of the pipe 51 (see Figure 3) and in so doing prevents steam from entering the rocker member in such a position. The inlet passages 54 and 55 lead through the stem 44 to the interior of the rocker member, opening at opposite sides of the partition therein, as best shown in Figures 2 and 5. The facial enlargements also provide for the exhaust ports 49 and 50, these ports being connected in each instance by branch pipes 57 and 58 to exhaust pipes 59. The exhaust pipes 59 in each instance, communicate through suitable openings provided in the hub 17 and the shaft 7 with an exhaust passage 59' located in the end of the shaft carried by the bearing 5. Means later described are provided for rocking the rocker members and it will be observed that should the rocker members shown in Figure 2 be turned in either direction, one end thereof will swing down and communicate with one of the chambers 31, whilst the other end will move up and uncover the exhaust port to permit the expanded steam in the preceding chamber 31 to exhaust. When steam is exhausting in this way from one chamber, it is being admitted to the other through one or other of the ports 54 or 55. The rocker members are all simultaneously rocked by a device hereinafter described.

On the outer end of the hub 17, I mount a sleeve 60 which rotates with the hub but is free to move endwise thereon. The sleeve carries or is provided with a circumscribed channel which receives a ring 61. The bracket 4 carries pivotally a lever 62 and the lower end of the lever is forked to span the shaft 7 and the forked ends thereof are connected by similar side links 63 pivotally to the ring, the arrangement being such that the shifting of the lever shifts the ring and such that the sleeve is free to rotate within the ring at all times. The sleeve is longitudinally slotted at spaced intervals, the slots 60'' receiving similar lugs 17' which extend outwardly from the hub 17 and are positioned ninety degrees apart. Inner cups 64 are pivotally connected to the lugs and in these cups, I seat the inner ends of similar expansion springs 65, the outer ends of which are seated in cups 66, pivotally attached to the inner ends of levers 67, the levers having their outer ends permanently bolted as indicated at 68 to the spindles 44. The sleeve 60 carries a casing 69 which houses the cups and springs and receives the levers 67. Each lever passes through a central slot 70 formed in the casing and the ends of this central slot communicate with oppositely disposed triangular shaped openings 71 and 72 formed in the casing (see Figure 4). When the casing is in the central position, as shown, the levers 67 cannot swing sideways in either direction under the action of the springs 65 as they are restrained by the slots 70. However, should the sleeve 60 be moved out or in by manipulating the lever 62, the levers 67 will be passed from the slots 70 into one or other of the triangular openings and once the levers 67 are freed from the slots 70, they are brought under the direct influence of the springs 65 which are constantly tending to expand and are attempting to take the position as shown in dotted outline in Figure 3 or a reverse position at the opposite side.

In order to insure that the springs 65 will positively act on the levers 67, I have provided flat springs 73 in the triangular openings which are adapted to act and throw the levers sideways. I might point out, however, that the levers 67 although they may be in the triangular openings and under the influence of both the springs 73 and 65, cannot move until such times that the ribs 25 have passed from a central position underlying the partitions 42 and as shown in Figure 2 to a moved position where they are clearing the open sides of the rocker members. The instant, however, the ribs 25 pass away from the rocker members, the rocker members move under the initial action of the spring 73 and the subsequent action of the springs 65. The movement so brought about in the rocker members permits live steam to enter the chambers 31 by way of the entry ports 54 or those 55 (depending on the setting of the lever 62), and allows the exhausted steam to escape through the outlet passages 49 or those 50.

By observing Figure 2, it will be seen that if the rotors are moving in the direction indicated by the applied arrows, the trailing ends of the rocker members will move down as the ribs 25 are passing the same and as they move down, live steam will enter the chambers 31 through the entry ports 55. the steam expanding in those parts of the chambers to the rear of the passing webs and exhaust steam will be exhausting through the exhaust ports from those ports of the chamber 31 in advance of the webs.

The direction of rotation of the engine, whether clockwise or anti-clockwise is determined by manipulating the lever 62. If the lever 62 is manipulated to pass the levers 67 into the openings 71, the rotation will be clockwise and if into the opening 72, anti-clockwise. Once the lever 62 has been set in either position, the rocker members will be continuously rocked back and forward under the influence of the springs and the influence of the ribs 25. Obviously as each rib 25 advances underneath the out held end of each rocker member and engages with the inwardly held end of the rocker member, it will force it out against the action of the springs and bring it to the neutral position as shown in Figure 2, after which as the ribs advance, the rocker member will be rocked by the action of the springs to admit live steam and permit of exhaust.

Whilst I have entered into a detailed description of parts, it is readily understood that I do not desire to be limited to the exact structures shown as these can be readily modified without departing from the spirit of the invention as set forth in the appended claims. Further it is obvious that the number of chambers 31 and rocker members can be increased or diminished as occasion requires and that the rotor 16 can be made stationary and that a variation in the speed of rotation of the engine can be had also by varying the radius of the gears 10 and 12 and inclining the spindles 6 so that the pinions 9 will mesh with the different sized gears employed.

The live steam admitted to the passage 50 is controlled by a rotary valve 74 of any approved type which can be manipulated by hand to open or closed position.

What I claim is my invention is:—

1. In a rotary steam engine, an outer rotor, an inner rotor mounted therewithin, said inner rotor being provided with spaced peripheral ribs contacting with the outer rotor and providing a plurality of working chambers between the rotors, a plurality of rocker members carried by the outer rotor and corresponding in number to the number of working chambers and adapted to ride the peripheral face of the inner rotor and divide the working chambers into steam receiving and steam exhausting compartments, means for admitting live steam to the live steam compartments through the rocker members and means controlled by the movement of the rocker members for exhausting the exhaust steam from the exhaust compartments.

2. In a rotary steam engine, an outer rotor, an inner rotor spaced therefrom and provided with spaced peripheral extensions continuously contacting with the inner face of the outer rotor, the said rotors and peripheral extensions forming a plurality of working chambers between the rotors, a plurality of rocker members carried by the outer rotor and adapted to ride the peripheral face of the inner rotor and divide the several working chambers into steam receiving and steam exhausting compartments, means for introducing live steam through the rocker members to the live steam compartments and means controlled by the movement of the rocker members for simultaneously exhausting the exhaust steam from the several exhaust steam compartments.

3. In a rotary steam engine, an outer rotor, an inner rotor contained within the outer rotor and provided with equi-spaced peripheral ribs continuously contacting with the inner face of the outer rotor, the said rotors and ribs forming a plurality of similar working chambers between the rotors, rocker members carried by the outer rotor and corresponding in number to the number of working chambers and adapted to ride the peripheral face of the inner rotor and divide the several working chambers into steam receiving and steam exhausting compartments, means for admitting live steam through the rocker members to the live steam compartments and means controlled by the movement of the rocker members for exhausting the exhaust steam from the exhaust steam compartments.

4. In a rotary steam engine, an outer rotor, an inner rotor contained within the outer rotor and provided with equi-spaced peripheral ribs continuously contacting with the inner face of the outer rotor, the said rotors and ribs forming a plurality of similar working chambers between the rotors, rocker members carried by the outer rotor and corresponding in number to the number of working chambers and adapted to ride the peripheral face of the inner rotor and divide the working chambers into steam receiving and steam exhausting compartments, live steam connections passing through the axis of the inner rotor and communicating with the rocker members and through the rocker members with the live steam compartments and means controlled by the movement of the rocker members for exhausting exhaust steam simultaneously from the exhaust compartments.

5. In a rotary steam engine, an outer rotor, an inner rotor contained within the outer rotor and provided with equi-spaced peripheral ribs continuously contacting with the inner face of the outer rotor, the said rotors and ribs forming a plurality of similar working chambers between the rotors, rocker members carried by the outer rotor and corresponding in number to the number of working chambers, said rocker members being hollow to provide steam inlet passages and being adapted to ride the peripheral face of the inner rotor and divide the working chambers into live steam receiving compartments and exhaust steam compartments, live steam connections passing axially through the inner rotor and communicating with the inlet passages of the rocker members and through the said inlet passages with the several live steam compartments and means controlled by the movement of the rocker members for simultaneously exhausting the exhaust steam from the several exhaust compartments.

6. In a rotary steam engine, an outer rotor, an inner rotor contained within the outer rotor and provided with equi-spaced peripheral ribs continuously contacting with the inner face of the outer rotor, the said rotors and ribs forming a plurality of similar working chambers between the rotors, a plurality of rocker members carried by the outer rotor and corresponding in number to the number of working chambers and adapted to ride the peripheral face of the inner rotor and divide the several working chambers into steam receiving and steam exhausting compartments and said rocker members being further each provided with two live steam inlet passages disposed in opposite directions for forward and reverse rotation of the rotors, a valve associated with each rocker member and controlling the admission of steam to one or other of the passages depending on the setting of the valve, live steam connections passing axially through the inner rotor and communicating with the valves and means controlled by the movement of the rocker members for simultaneously exhausting the exhaust steam from the several exhaust compartments.

7. In a rotary steam engine, an outer rotor, an inner rotor within the same and provided with a plurality of equi-spaced facial ribs contacting with the inner wall of the outer rotor, the ribs and rotors forming a plurality of similar working chambers between the rotors, a plurality of housings carried by the outer rotor and corresponding in number to the number of working chambers, a valve casing located at one end of each housing, a rocker member rotatably mounted in each housing and adapted to ride the peripheral face of the inner rotor and divide the working chambers into live steam receiving and steam exhausting compartments, the said rocker members being further interiorly divided to provide oppositely directed live steam inlet passages for forward and reverse rotation of the rotors, a valve located at the end of each rocker member and mounted within the valve casing, means for simultaneously passing live steam to the several valve casings, means for setting the valves to admit the live steam to one or other of the passages of the rocker members dependent on the setting of the valves and means controlled by the movement of the rocker members for simultaneously exhausting the exhaust steam from the several exhaust steam compartments.

8. In a rotary steam engine, an outer rotor, an inner rotor contained within the same and provided with a plurality of equi-spaced facial ribs contacting with the inner face of the outer rotor, the said ribs and rotors forming a plurality of similar working chambers between the rotors, a plurality of housings carried by the outer rotor and corresponding in number to the number of working chambers, a rocker member mounted in each housing and adapted to ride the peripheral face of the inner rotor and divide the working chambers into live steam receiving and exhaust steam exhaust compartments, said rocker members further providing oppositely directed steam inlet passages, one of which in the rocking of the rocker member communicates with a live steam compartment and the other of which is closed by the housing, a valve associated with each rocker member and provided with two passages communicating with the passages of the rocker member, a valve casing containing each valve, means for passing live steam to the several valve casings, means for setting the valves to initially admit live steam to one or other of the live steam passages of the rocker members and through such selected passages to the live steam compartments and means controlled by the movement of the rocker members for simultaneously exhausting steam from the exhaust steam compartments.

9. In a rotary steam engine, an outer rotor, an inner rotor contained within the same and provided with a plurality of equi-spaced facial ribs contacting with the inner face of the outer rotor, the said ribs and rotors forming a plurality of similar working chambers between the rotors, a plurality of housings carried by the outer rotor and corresponding in number to the number of working chambers, a rocker member mounted in each housing and having either end thereof adapted to ride the outer face of the inner rotor depending on the setting of the rocker member and to divide the adjacent working chamber into live steam receiving and steam exhausting compartments, said rocker members being further interiorly divided to provide oppositely directed steam inlet passages, one of which communicates with the adjacent live steam compartment and the other of which is closed by the wall of the housing, a valve associated with each rocker member and presenting two inlet passages communicating with the former passages of the rocker member, a casing containing each valve, a live steam pipe leading to each casing, means for simultaneously controlling the valves to admit live steam to one or other of the passages thereof and through the rocker members to the live steam compartments and exhaust ports formed in the housings and controlled by the movement of the rocker members and adapted to permit of the exhausting of steam from the exhaust steam compartment coincident with the admission of live steam to the live steam compartment.

Signed at the city of Brandon, Manitoba, this 24th day of November 1924.

NELSON P. LITHANDER.